Jan. 21, 1936.  C. M. HOUSTON  2,028,329
COUPLING FOR TUBULAR JOINTS OF THE EXPANSION JOINT TYPE
Filed Nov. 4, 1935
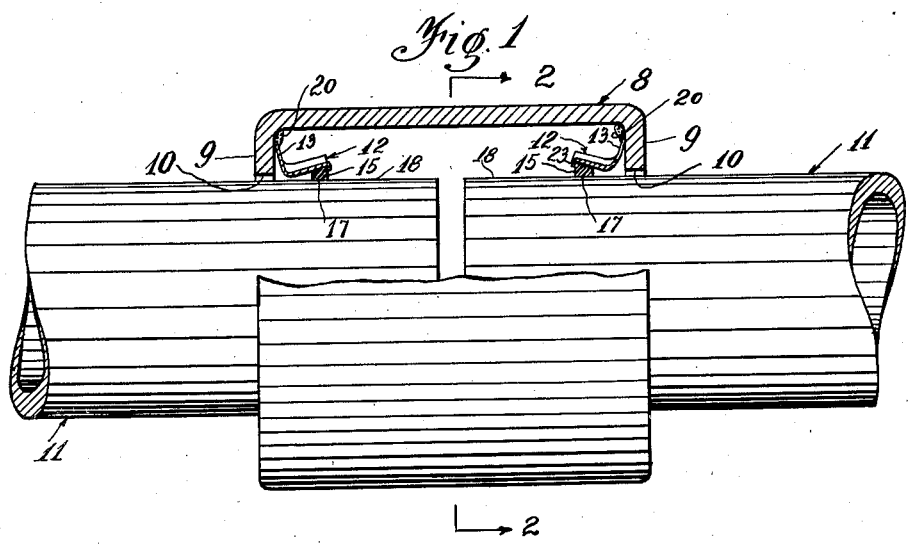
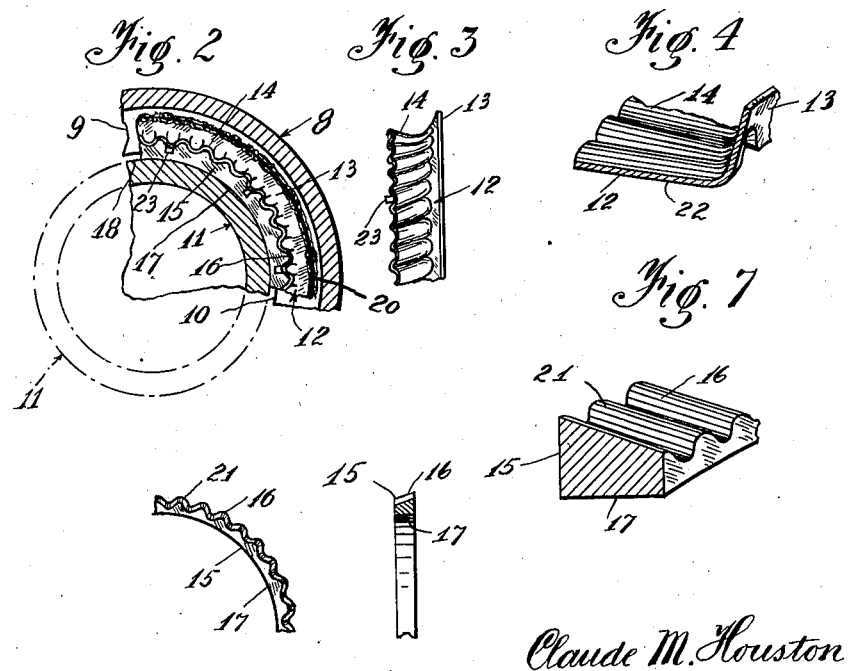
Claude M. Houston
INVENTOR.
BY Ralph Donath
ATTORNEY Patented Jan. 21, 1936

2,028,329

UNITED STATES PATENT OFFICE 2,028,329

COUPLING FOR TUBULAR JOINTS OF THE EXPANSION JOINT TYPE

Claude M. Houston, Pittsburgh, Pa.

Application November 4, 1935, Serial No. 48,199

6 Claims. (Cl. 285—193)

This invention relates to an improvement in couplings particularly designed for use as a coupling for tubular members and of the expansion joint type.

One of the objects of this invention is to provide a coupling which permits longitudinal adjustment of the tubular members.

Another object of the invention is to provide a coupling which is tight against leakage under internal pressure in a line system.

Still another object of the invention is the provision of means in which the sealing action of resilient rings is due not solely to the direct pressure by said rings on the tubular members, but in addition to a radial outward pressure against the sealing members differentially greater than the internal working pressure within the pipe line.

Additional features and advantages of the invention will appear from the following description considered in connection with the accompanying drawing.

In the drawing:

Figure 1 is a fragmentary side elevation showing the use of my improved coupling attached to a pipe line.

Figure 2 is a fragmentary sectional view along line 2—2 in Figure 1.

Figure 3 is a side elevation of the corrugated disk sleeve as employed in my invention.

Figure 4 is an enlarged fragmentary perspective view of the corrugated disk sleeve.

Figure 5 is a fragmentary front elevation of the gasket as used in my invention.

Figure 6 is a side view of Figure 5.

Figure 7 is an enlarged fragmentary perspective view of the gasket as shown in Figures 5 and 6.

Reference being had to the drawing, a coupling built in accord with my invention follows in its outward appearance the usual shape used for common sleeve connections and consists of a cylindrical housing 8 provided at both ends with inwardly diverging flanges 9 which form a concentric and annular opening 10 substantially larger as the outside diameter of the tubular members 11.

Disposed within said housing 8 are a pair of oppositely directed corrugated flanged collars 12, preferably made from thin metal, each of which includes a flat circular flange 13 which merges into an outwardly inclined corrugated sleeve 14, as particularly shown in Figures 1 to 4 inclusive.

The flexible gasket 15 having inclined corrugations 16 which mate with the corrugations of said sleeve 14 when in position as shown in Figures 1 and 2 is also provided with an annular bore 17 which fits snugly over the outer extremities 18 of said tubular members 11.

When assembling, the insertion of the flanged collars 12 through the considerably smaller circular opening 10 of the housing 8 is being accomplished by slightly compressing the flanged collar 12 so it will assume the shape of an ellipse. After said flanged collars are so inserted and released from its finger-hold the same will automatically again assume a circular configuration. The same method is used when inserting the gasket 15, as will be understood.

Referring now to Figures 1 and 2 it will be noted that the flange 13 of the flanged collar 12 is welded or soldered firmly around the outer edge of said flange 13 to the inner face 19 of the diverging flanges 9 of the housing 8 and this is indicated by the numeral 20.

The corrugated top portion 21 of the gasket 15, when in final position, fits within the underside 22 of the correspondingly corrugated flanged collar 12 and in order to prevent said gasket 15 from slipping out of engagement of the flanged collar 12 a series of downwardly disposed lips 23 project beyond the end of the corrugations of the sleeve 14.

In operation, each of the two gaskets bear tightly against a portion of the outer surface of the tubular members 11 within housing 8 and the relative dimensions of the gasket contact area on the tubular member surface and the corrugated collar exposed to the working pressure within the line system being such that the pressure intensity transmitted by the gasket is differentially greater than the working pressure intensity within the line system, thus a constant sealed joint will be obtained, since the tightness of the seal against leakage being automatically augmented as the internal pressure within the line system is increased.

I claim:

1. In an expansion joint for a pipe line, a cylindrical housing enclosing the juxtaposed ends of the tubes to be connected, a flexible ring positioned at each end of the housing, each ring being of substantially L-shape cross section comprising a flange and a sleeve element, the flange of each ring being secured to the housing and each sleeve surrounding its corresponding pipe end in spaced relation, and a gasket of yielding material inserted between each sleeve and tube end.

2. In an expansion joint for a pipe line, a cylindrical housing enclosing the juxtaposed ends of the tubes to be connected, a flexible ring positioned at each end of the housing, each ring being of substantially L-shape cross section comprising a flange and a sleeve element, the flange of each ring being secured to the housing and each sleeve surrounding its corresponding tube end in spaced relation, a gasket of yielding material inserted between each sleeve and tube end and the contact area of each gasket on said tube end being less than the area of the sleeve member exposed to the hydrostatic pressure within said pipe line.

3. In an expansion joint for a pipe line, a cylindrical housing having inwardly directed end-flanges enclosing the juxtaposed ends of the tubes to be connected; a flexible metallic ring of substantially L-shaped cross section comprising a flange and a sleeve element, the flange of each ring being secured to a flange of said housing and each sleeve surrounding its corresponding tube end in spaced relation; a gasket of yielding material forced under initial pressure between each sleeve and tube end, the contact area of each gasket on its corresponding tube being less than the area of the sleeve member exposed to the hydrostatic pressure within said pipe line.

4. In an expansion joint for a pipe line, a cylindrical housing having inwardly directed end-flanges enclosing the juxtaposed ends of the tubes to be connected; a flexible metallic ring of substantially L-shape cross section comprising a flange and a sleeve element, the flange of each ring being secured to a flange of said housing and each sleeve surrounding its corresponding tube end in spaced relation; a gasket of yielding material forced under initial pressure between each sleeve and tube end, the contact area of each gasket on its corresponding tube being less than the area of the sleeve member exposed to the hydrostatic pressure within the pipe line and means to hold said gasket in position.

5. In an expansion joint for a pipe line, a cylindrical housing having inwardly directed end-flanges enclosing the juxtaposed ends of the tubes to be connected; a flexible metallic ring of substantially L-shape cross section comprising a flange and a sleeve element, the flange of each ring being secured to a flange of said housing and each sleeve surrounding its corresponding tube end in spaced relation; a gasket of yielding material forced under initial pressure between each sleeve and tube end, the contact area of each gasket on its corresponding tube being less than the area of the sleeve member exposed to the hydrostatic pressure within the pipe line, means to hold said gasket in position and means positioned on the sleeve elements of said rings to hold said gasket in position.

6. In an expansion joint for a pipe line, a cylindrical housing having inwardly directed end-flanges enclosing the juxtaposed ends of the tubes to be connected; a flexible metallic ring of substantially L-shape cross section comprising a flange and a sleeve element, the flange of each ring being flat and secured to the housing and each sleeve being corrugated and surrounding its corresponding tube in spaced relation; a gasket of yielding material inserted between each flange and tube-end, said gaskets being outwardly corrugated to closely register with the sleeve elements.

CLAUDE M. HOUSTON.